G. V. HARRIMAN.
CLUTCH.
APPLICATION FILED MAY 5, 1915.
1,191,893.
Patented July 18, 1916.
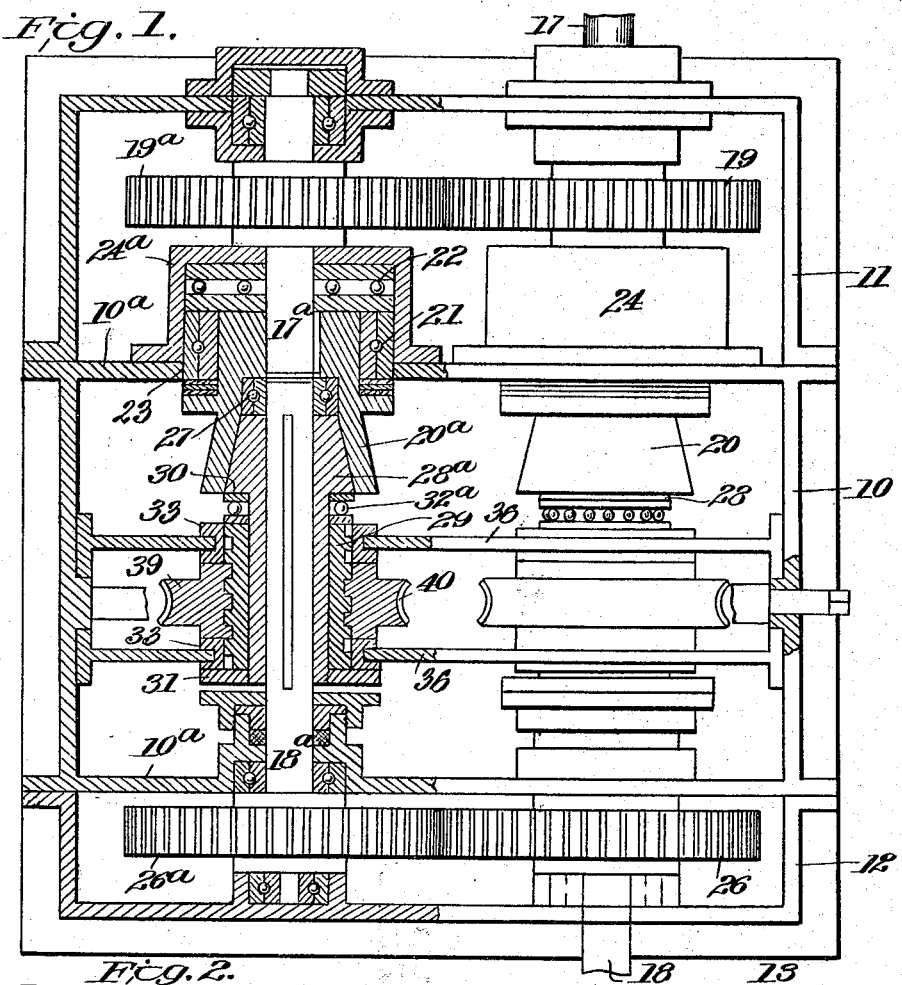
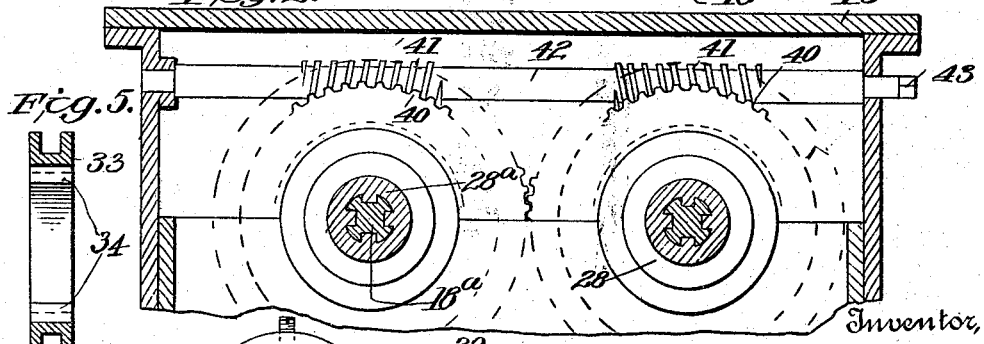
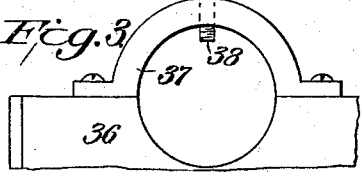
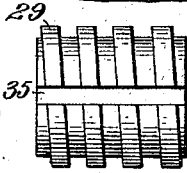
Inventor,
George V. Harriman.
By Frederick V. Winters
Attorney

UNITED STATES PATENT OFFICE.

GEORGE V. HARRIMAN, OF NEW YORK, N. Y.

CLUTCH.

1,191,893.  Specification of Letters Patent.  Patented July 18, 1916.

Original application filed December 16, 1914, Serial No. 877,570. Divided and this application filed May 5, 1915. Serial No. 26,065.

*To all whom it may concern:*

Be it known that I, GEORGE V. HARRIMAN, a citizen of the United States, residing at New York, in the county and State of New York, have invented certain new and useful Improvements in Clutches, of which the following is a full, clear, and exact specification.

This invention relates to clutches especially designed for use in connection with transmission gearing for automobiles, and it has for its object to provide a simplified construction and arrangement of parts, whereby power may be transmitted noiselessly from one shaft to another and without injury to the mechanism, such changes may be made without injurious effects, and friction will be reduced to a minimum.

It is also the aim of this invention to increase the strength and efficiency of all the wearing parts and bearing points, and to make the parts interchangeable as far as possible.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a transverse horizontal sectional view through a casing containing portion of a transmission including two clutches constructed in accordance with the present invention. Fig. 2 is a broken vertical section through the structure shown in Fig. 1. Fig. 3 is a detailed side view of one of the bearings for the spools which hold the threaded operating sleeves against turning. Fig. 4 is a detailed view of one of said sleeves, and Fig. 5 is a detailed sectional view of one of said spools.

The casing or housing for the transmission mechanism is made preferably in sections, including a middle section 10, two end sections 11 and 12, and a top or cover 13. The end walls $10^a$ of the middle section 10 constitute vertical partitions in the casing as a whole.

Two pairs of end to end shafts are illustrated in the drawings, each pair comprising what will be hereinafter termed a driving and a driven shaft. The driving shaft 17 of one pair is the motor shaft and the other shaft 18 of that pair is the transmitting driven shaft. These two shafts are the only ones which extend beyond the casing, the other pair of shafts being entirely contained within the casing and serving to give a different speed from the motor driven shaft 17 to the transmitting shaft 18.

The shaft 17 is journaled in the end section 11 of the casing and in the adjacent end wall $10^a$ of the middle section of said casing. A gear 19 is keyed to turn with said shaft in the space between the end section 11 and the middle section of the casing. On the inner end of the shaft 17, a friction clutch member 20 is keyed or otherwise fixed to turn therewith, and said inner end portion of said shaft is fitted with a cap 24. The shaft 18 is journaled in the end section 12 and the other end wall $10^a$ of the middle section of the casing. A gear 26 is keyed on the shaft 18 in the end section 12 of the casing. The inner end of the shaft 18 extends into the clutch member 20 and is fitted with an inner friction clutch member 28 supplementary to the clutch member 20. Said clutch member 28 is splined on the shaft 18 and is preferably conical and designed to enter a cone cup on the clutch member 20. The other pair of shafts $17^a$ and $18^a$ carry gears $19^a$ and $26^a$ respectively, and are fitted with supplemental clutch members $20^a$ and $28^a$, respectively. The shaft $17^a$ is fitted with a cap $24^a$ similar to the cap 24. The structure of the clutch being the same on each pair of shafts, and the pair of shafts $17^a$ and $18^a$ being shown in section in Fig. 1, the description of said clutch will apply specifically to that pair of shafts rather than to the pair of shafts 17 and 18.

Antifriction bearings 21 and 22 may be provided for reducing the friction caused by the rotation and thrust of the shaft $17^a$, these bearings being disposed between the annular surface of the clutch member $20^a$ and a suitable opening 23 in the wall $10^a$ of the middle section of the casing and the inner annular surface of the cap $24^a$, and between the ends of said clutch member and cap, respectively. The clutch member $28^a$ is actuated by a sleeve 29 fitted loosely around the middle portion of said clutch member between shoulders or flanges 30 and 31. An antifriction bearing 32 is placed between the shoulder 30 adjacent the cone, and the corresponding end of the sleeve 29 to take the thrust in operation. Said sleeve is guided in spools 33 having keys 34 fitted to slide in axial grooves 35 in the sleeve 29. The spools 33 are arranged in notches in narrow transverse partitions 36 in the middle section of the casing, and are retained in said notches by straps 37, see Fig. 3. Said spools are held against turning by set screws 38 passed through the straps 37. As shown in Fig. 1, two spools 33 are used, and between them is arranged a worm gear 39 having its bore threaded to engage the correspondingly threaded outer surface of the sleeve 29. The spools being held against turning by the set screws 38, and said sleeve being held against turning within the spools by the keys 34 engaging the slots 35, it is evident that rotation of the worm gear 39 will move the sleeve 29 axially, owing to the threaded connection between said gear and sleeve, and that the axial movement of the sleeve will impart a similar movement to the clutch member 28ª, tending to advance the same into driving connection with the supplemental clutch member 20ª, or vice versa.

The worm gear 39 and corresponding worm gear for operating the clutch member 28, are adapted to be simultaneously actuated by a transverse rock shaft 42 having oppositely inclined worm gear sections 41 adapted to mesh with the concave peripheries 40 of said worm gears 39. The rock shaft 42 is provided with a wrench surface 43 on its projecting end for connection by any suitable means (not shown) to a controlling device in reach of the driver of the automobile. Of course, the rock shaft may be placed in a neutral position, when both clutches will be thrown out. When one clutch is thrown in, the other clutch is simultaneously thrown out on account of the oppositely inclined worm gear sections 41 on the rock shaft 42.

This application is a division of my pending application for transmission for automobiles, filed December 16, 1914, Ser. No. 877,570.

Having thus described my invention, what I claim as new and desire to secure by Letters Patent of the United States is:—

1. The combination with a driving and a driven shaft arranged end to end, of a clutch member fixed on one of said shafts, a supplemental clutch member splined on the other shaft and having oppositely facing shoulders, a threaded sleeve fitted loosely around said supplemental clutch member between said shoulders, means for holding said sleeve against turning but permitting it to move axially, a worm gear retained against axial movement and having internal threads engaging said sleeve, and means for actuating said worm gear for moving said splined clutch member into and out of driving connection with the other clutch member.

2. The combination with a driving and a driven shaft arranged end to end, of a clutch member fixed on one of said shafts, a supplemental clutch member splined on the other shaft and having oppositely facing shoulders, a threaded sleeve fitted loosely around said supplemental clutch member between said shoulders, an antifriction bearing interposed between the shoulder, which is nearer the other clutch member, and the adjacent end of the sleeve for taking the thrust, means for holding said sleeve against turning but permitting it to move axially, and an internally threaded operating member engaging said sleeve and retained against axial movement for moving said splined clutch member into and out of driving connection with the other clutch member.

3. The combination with a driving and a driven shaft arranged end to end, of a clutch member keyed to one shaft, a journal cap housing the rear end of said clutch member, antifriction bearings arranged between the annular surface of said clutch member and inner annular surface of said cap, and between the ends of said clutch member and cap, a supplemental clutch member splined on the other shaft, and means for moving said splined clutch member into and out of driving connection with the other clutch member.

4. The combination with a driving and a driven shaft arranged end to end, a clutch member fixed on one shaft, a splined clutch member on the other shaft, a sleeve fitted loosely around said splined clutch member and having threads upon its outer surface and axial grooves across said threads, spools retained against movement and provided with keys engaging the grooves in said sleeve, an operating member arranged between said spools and having internal threads engaging the threads on the sleeve, and means whereby the longitudinal movement of the sleeve will actuate the splined clutch member.

In testimony whereof I have signed my name to this specification.

GEORGE V. HARRIMAN.

Copies of this patent may be obtained for five cents each, by addressing the "Commissioner of Patents, Washington, D. C."